(12) United States Patent
Rodríguez Tsouroukdissian

(10) Patent No.: US 8,641,369 B2
(45) Date of Patent: Feb. 4, 2014

(54) SYSTEM AND METHOD FOR DAMPING VIBRATIONS IN A WIND TURBINE

(75) Inventor: Arturo Rodríguez Tsouroukdissian, Barcelona (ES)

(73) Assignee: Alstom Wind, S.L.U., Barcelona (ES)

( * ) Notice: Subject to any disclaimer, the term of this patent is extended or adjusted under 35 U.S.C. 154(b) by 0 days.

(21) Appl. No.: 13/386,776

(22) PCT Filed: Aug. 2, 2010

(86) PCT No.: PCT/EP2010/061235
§ 371 (c)(1), (2), (4) Date: Jan. 24, 2012

(87) PCT Pub. No.: WO2011/015563
PCT Pub. Date: Feb. 10, 2011

(65) Prior Publication Data
US 2012/0121413 A1    May 17, 2012

(30) Foreign Application Priority Data
Aug. 6, 2009 (EP) ..................... 09167385

(51) Int. Cl.
*F03D 11/00* (2006.01)
(52) U.S. Cl.
USPC .......................................... 415/119
(58) Field of Classification Search
USPC .......................... 415/119; 416/500
See application file for complete search history.

(56) References Cited

U.S. PATENT DOCUMENTS

| | | | |
|---|---|---|---|
| 5,934,028 A * | 8/1999 | Taylor | 52/167.3 |
| 2007/0056817 A1 * | 3/2007 | Ward | 188/314 |
| 2007/0114799 A1 | 5/2007 | Riesberg | |

FOREIGN PATENT DOCUMENTS

| | | |
|---|---|---|
| EP | 1677033 | 7/2006 |
| EP | 1811171 | 7/2007 |
| JP | 11081735 | 3/1999 |
| JP | 2004027832 | 1/2004 |
| JP | 2004060397 | 2/2004 |
| WO | 2008000265 | 1/2008 |

OTHER PUBLICATIONS

Constantinou, M.C., Tsopelas, P., Hammel, W., and Sigaher, A. (2001) Toggle-brace-damper seismic energy dissipation systems,"Journal of Structural Engineering" 127(2): 105-112.
Hwang, J-S, Huang, Y-N, and Hung, Y-H (2005), Analytical and Experimental Study of Toggle-Brace-Damper Systems, "Journal of Structural Engineering" 127(2): 1035-1043.

(Continued)

*Primary Examiner* — Dwayne J White
(74) *Attorney, Agent, or Firm* — Squire Sanders (US) LLP

(57) ABSTRACT

The invention relates to a wind turbine comprising a substantially tubular tower structure and one or more vibration damping systems. At least one of the one or more vibration damping systems include a plurality of bracing elements and a damping element. One of the bracing elements is connected to the tower structure. The bracing elements and damping element are linked in such a way that a local displacement of the tower structure causes an increased displacement of the damper along its longitudinal axis. The invention further provides a method of damping vibrations in a wind turbine tower using one or more toggle-brace vibration damping systems and a using a toggle-brace vibration damping system for damping vibrations in a wind turbine.

15 Claims, 16 Drawing Sheets

(56) References Cited

OTHER PUBLICATIONS

Lee, S-H., Min, K-W, Chung, L., Lee, S-K, Lee, M-K, Hwang, J-S, Choi, S-B, Lee, H-G, Bracing Systems for Installation of MR Dampers in a Building Structure, "Journal of Intelligent Material Systems and Structures", vol. 18—Nov. 2007, p. 1111-1120.

International Search Report and Written Opinion for PCT/EP2010/061235 of Feb. 24, 2011.

* cited by examiner

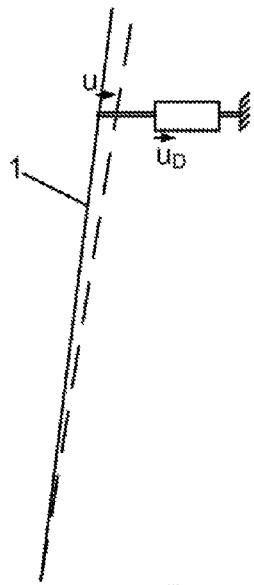
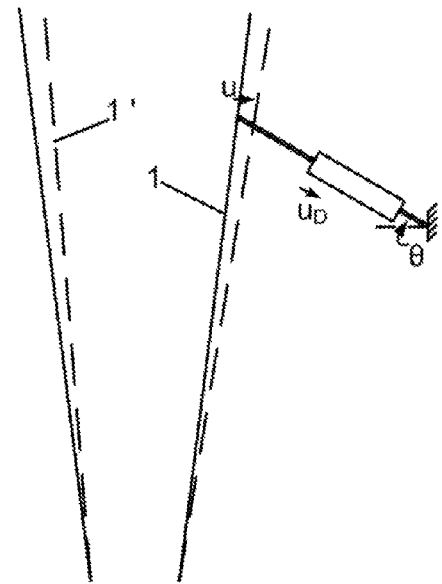
Figure 1a  Figure 1b
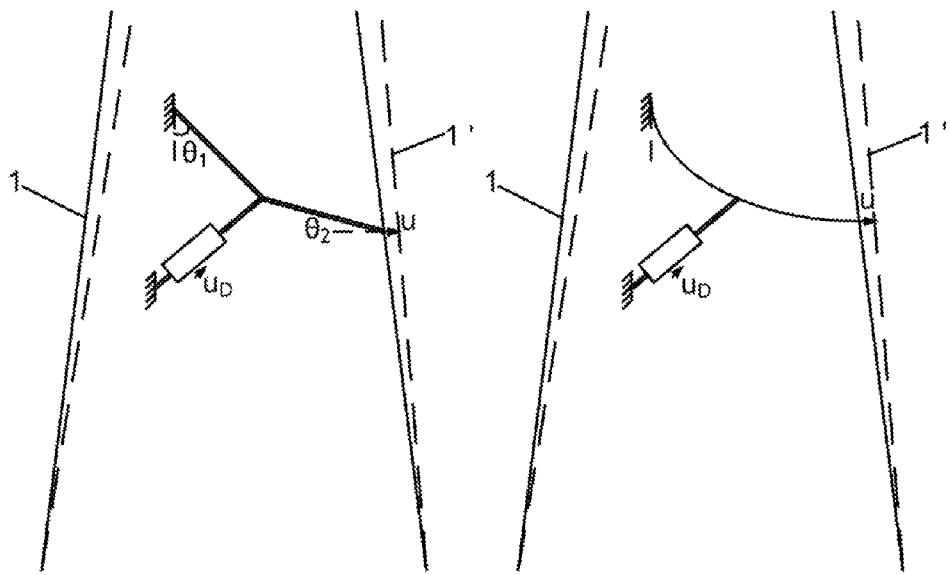
Figure 1c  Figure 1d

SYSTEM AND METHOD FOR DAMPING VIBRATIONS IN A WIND TURBINE

CROSS-REFERENCE TO RELATED APPLICATIONS

This application claims priority to PCT Application No. PCT/EP2010/061235 entitled "System And Method For Damping Vibrations In A Wind Turbine", filed Aug. 2, 2010 which claims priority to European Patent Application No. 09167385.5 entitled "System And Method For Damping Vibrations In A Wind Turbine", filed Aug. 6, 2009.

BACKGROUND

The present invention relates to a method and system for damping vibrations in a wind turbine tower.

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor or through the use of a gearbox. The hub, gearbox (if present), generator and other systems are usually mounted in a nacelle on top of a wind turbine tower.

Various configurations of wind turbine towers are known. Most modern wind turbines comprise a tubular tower structure. Said tubular structure may be made from steel and/or concrete, and may be made from a single segment or may comprise various segments. Other wind turbine towers are made from truss structures. Furthermore, hybrid wind turbine towers are known, which comprise a combination of the previously described tower concepts.

During operation of a wind turbine, undesired vibrations may occur in the wind turbine tower structure. Vibrations in this sense are meant to include any kind of oscillatory or repeating displacements in any direction (transverse, longitudinal or torsional) of any amplitude (large or small) and of any frequency (high or low, constant or varying). These vibrations may be caused by different factors, e.g. wind acting on the tower, blades passing along the tower and locally disturbing the wind flow, vibrations transmitted from the gearbox to the tower, rotor movements, nacelle imbalances, vibrations from the hub transmitted to the tower etc. If a tower is subjected to this kind of vibrations during a prolonged period of time, fatigue damage may result. Fatigue damage may lead to a reduced life time of the wind turbine tower and/or its components. Furthermore, the danger exists that when vibrations cause resonance in the wind turbine tower, this can lead to a potentially dangerous increase of the vibrations.

A further complicating factor is that the size of wind turbines (rotor, nacelle, tower, etc.) keeps increasing. As towers become larger and more slender, they also become more sensitive to induced vibrations.

Also, in the future, wind turbines will be increasingly placed offshore or near-shore. Whether the wind turbine tower is floatingly arranged (offshore) or arranged on a foundation in the sea bed (near-shore), the waves of the sea may form another source of vibrations in the wind turbine tower. Additionally, the design tip speed ratio of wind turbines placed offshore or near-shore is generally higher than for wind turbines placed on shore. The hub will thus rotate at higher speeds. The frequency with which blades pass past the tower thus also increases. The danger of vibrations reaching a resonant frequency of the wind turbine tower increases therewith.

There is thus a clear need to provide a method and system for damping vibrations in wind turbine towers. In the prior art, several systems have been proposed. It is e.g. known to actively control the pitch angle of the rotor blades or the rotational speed of the wind turbine to limit vibrations in the wind turbine tower. However, this means that from time to time the wind turbine is operated in sub-optimal conditions and the electricity generated by the wind turbine is below its potential in order to limit the vibrations in the tower. Additionally, if e.g. pitch control is used to limit the vibrations, the pitch motor(s) are more intensively used, which may reduce the lifetime of the pitch motors.

It may further be proposed to simply increase the thickness of the wind turbine tower. However, this increase of material in the tower would certainly increase the cost of the wind turbine and may even complicate the transport of the tower (segments) to location.

It is also known to provide a tuned mass damper in the form of a mass suspended from the nacelle to counteract the $1^{st}$ fore-aft and $1^{st}$ side-to-side tower mode. Suspending a mass at the top of the tower may reduce the available space at the top of the tower (where the available space is already very limited). Additionally, this tuned mass damper can only be used for damping vibrations of a single frequency. In some other prior art embodiments, a mass is suspended a bit lower in the tower to damp the $2^{nd}$ fore-aft and $2^{nd}$ side-to-side mode. Also in this case, the available space in the tower for other systems is considerably reduced.

EP 1 677 033 discloses a wind turbine including a vibration load reduction system disposed at either the tower or the nacelle. The vibration load reduction system includes a base, at least two columns extending from the base, and a flowable mass located within the base and the at least two columns. This prior art solution thus adds a mass at the top of the tower, which in itself is not desirable.

WO 2008/000265 discloses a wind turbine tower and control means for establishing oscillation control values in the wind turbine and load altering means for optimizing the tower eigen frequency in response to the values from the control means. Said load altering means may include e.g. steel wires or rods arranged inside the wind turbine tower.

EP 1 811 171 discloses a system for damping a displacement of a wind turbine tower comprising a plurality of shock absorbers and a plurality of beams diagonally arranged within the wind turbine tower. This arrangement inherently has a limited ability to damp vibrations.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter.

It is a goal of the present invention to provide a system and method for damping vibrations in a wind turbine tower which at least partly reduces the above-mentioned drawbacks of prior art solutions.

In a first aspect, the invention provides a wind turbine comprising a substantially tubular tower structure and one or more vibration damping systems, at least one of said one or more vibration damping systems comprising a plurality of bracing elements and a damper, one of said bracing elements being connected to said tower structure, and said bracing elements and damper being linked in such a way that a local displacement of the tower structure causes an increased displacement of the damper along its longitudinal axis.

For a good damping of vibrations, it is desirable that even small displacements lead to a high damping force. The damping force generated in damping systems does not depend directly on the local displacement (or "drift") of the structure, but on the relative displacement of the damper along the axis of the damper that is caused by this drift.

$$\text{In general:} u_D = f \cdot u \qquad \text{Eq. 1}$$

In this equation, $u_D$ is the relative displacement of the damper along the axis of the damper, f is a magnification factor and u is the local displacement along the wind turbine tower. Similarly, the force exerted by a damper (F) on the structure is proportional to the force along the axis of the damper ($F_D$) times the same magnification factor $$f : F = f \cdot F_D. \qquad \text{Eq. 2}$$

According to a first aspect of the invention, a plurality of bracing elements and a damper are provided. Bracing element in this sense is to be interpreted as any structural element that steadies, strengthens or stiffens the surrounding structure. The bracing elements may e.g. be formed by beams (of any cross-section), stiff rods or tubes etc.

In said first aspect of the invention, the bracing elements and damper are linked in such a way that a local displacement of the substantially tubular structure causes an increased displacement of the damper along its longitudinal axis (magnification factor f>1). Small local displacements of the wind turbine tower structure thus lead to bigger displacements of the dampers, which lead to higher damping forces. This will be further explained with reference to FIGS. 1a-1c.

In FIG. 1, a first tower-like structure 1 is shown. The structure 1 may deform under (vibrational) loads as indicated with the dotted line. With reference to FIG. 1a, the magnification factor (as used in Eq. 1) for a straight brace is equal to 1. With reference to FIG. 1b, for a diagonally arranged brace, the magnification factor is equal to cos θ. For a toggle-brace damping system (such as shown very schematically in FIG. 1c), said magnification factors can reach values of up to 2 or even as high as 3.6 (depending on the angles $θ_1$ and $θ_2$ chosen). Also, for an arrangement with a curved beam (of e.g. glass fibre) such as is shown in FIG. 1d, or for some hybrid arrangement such as shown in FIG. 1e, the magnification factor may be larger than 1. With another arrangement comprising a rocker, such as shown in FIG. 1f, the magnification factor may also be larger than 1.

The vibration damping systems do not require a lot of space (contrary to some prior art solutions suspending a mass from the nacelle down the tower) and may be arranged at various locations along the wind turbine tower. The wind turbine tower will thus still have enough available space for e.g. electrical cables, stairs or elevator within the tower. Furthermore, even a plurality of vibration damping systems may be arranged along the tower (while still not occupying a lot of space). The plurality of vibration damping systems may be used for damping of various vibration modes.

In some embodiments of the invention, at least one of said one or more vibration damping systems is a toggle-brace vibration damping system. A toggle-brace vibration damping system is formed by at least one toggle (comprising two bracing elements, jointed together end to end, but not in line) and a damping element connected to said at least one toggle.

In some embodiments, said toggle-brace vibration damping system comprises a damping element and a toggle having two bracing elements, said bracing elements being mounted within the wind turbine tower at their respective first ends and being connected to each other at their respective second ends, said damping element being mounted within the wind turbine at its first end, and at its second end being connected to the respective second ends of said bracing elements. These toggle-brace vibration damping systems are generally referred to as lower toggle-brace vibration damping systems (wherein the damping element is connected where the two bracing elements are connected and is arranged below the toggle) or upper toggle-brace vibration damping system (wherein the damping element is connected where the two bracing elements are connected and is arranged above the toggle).

In other embodiments, said toggle-brace vibration damping system comprises a damping element and a toggle having two bracing elements, said bracing elements being mounted within the wind turbine tower at their respective first ends and being connected to each other at their respective second ends, said damping element being mounted within the wind turbine at its first end, and at its second end being perpendicularly connected to one of said bracing elements. These toggle-brace vibration damping systems are generally referred to as reverse-toggle vibration damping systems (the damping element not being connected where the two bracing elements are connected and consequently being arranged substantially sideways of the toggle).

In yet other embodiments, said toggle-brace vibration damping system comprises a damping element and a first and second toggle, each toggle having two bracing elements, said two bracing elements of the first toggle being mounted within the wind turbine tower at their respective first ends and being connected to each other at their respective second ends, said two bracing elements of the second toggle being mounted within the wind turbine tower at their respective first ends and being connected to each other at their respective second ends, said damping element being connected at its first end to the respective second ends of the bracing elements of said first toggle and being connected at its second end to the respective second ends of the bracing elements of said second toggle. This configuration is generally referred to as a scissor-jack vibration damping system.

All described types of toggle-brace vibration damping systems may provide good damping. The choice between the alternatives may depend on e.g. the available space, the amount of damping that is required etc.

In an aspect of the invention, said bracing elements of at least one of the vibration damping systems are hingedly mounted at their first ends. In other embodiments, the bracing elements may be welded or otherwise "rigidly fixed" at their first ends. An advantage of hingedly mounting the braces is that fatigue damage may be reduced where the braces are connected to the wind turbine tower. In some embodiments, said bracing elements are hingedly mounted at their first ends with spherical bearing elements. An optional visco-elastic joint may further help to transfer the loads to the structure.

In another aspect of the invention, said bracing elements of at least one vibration damping system are hingedly connected at their second ends. Providing a hinging connection at their second end may further reduce fatigue damage. Within the scope of the invention however, alternative configurations are possible: the bracing elements may e.g. be welded or bolted together.

In a further aspect of the invention, a plurality of vibration damping systems are coupled to each other in an area positioned substantially at a central axis of the substantially tubular structure. Preferably, said plurality of vibration damping systems is coupled by a friction pendulum bearing system. A friction pendulum bearing system substantially isolates vibrations occurring in the damping system so that they are transferred in a lesser extent to the surrounding structure.

In some of the embodiments according to this aspect, at least three vibration damping systems are coupled to each other. By radially providing at least three vibration damping systems, vibrations due to asymmetrical loads (e.g. rotor imbalances) may be adequately reduced.

In some embodiments of the invention, the damper of at least one vibration damper system is a viscous fluid damper. Any other damper may also be used within the scope of the present invention. In some embodiments, the viscous fluid damper is a controllable magnetorheological fluid damper. This characteristic allows changing the damping coefficient of the viscous fluid to adjust the damping properties to varying conditions. Other dampers that may be used are e.g. electrorheological fluid dampers, rotational inertia dampers or solid friction dampers.

In yet another aspect of the invention, the substantially tubular structure of the wind turbine tower comprises a plurality of substantially tubular segments, the tower further comprising an intermediate structure where two segments are joined, at least one bracing element of said at least damping system supported at said intermediate structure. Wind turbine towers may be relatively high. For various reasons (e.g. transport, manufacture), many wind turbine towers nowadays comprise various segments which are joined at their ends. For a proper load transfer from one segment to another, generally some form of reinforcement structure is provided to join two segments together. It may be advantageous to mount one of the bracing elements of a damping system at said reinforcement structure. This way, further reinforcement structures in the tower may be avoided.

In an aspect of the invention, where the tower comprises various segments, at least two of said substantially tubular segments comprise at least one vibration damping system. Along the height of the tower, the damping requirements may vary. Different numbers and different kinds of vibration damping systems may be employed to adapt to the need of an individual tower.

In another aspect, the invention provides a method of damping vibrations in a wind turbine tower using one or more toggle-brace vibration damping systems.

In some embodiments of the invention, the toggle-brace damping systems may be actively or semi-actively controlled to damp different vibration modes. In other embodiments of the invention, the toggle-brace damping systems are passive. Preferably, if the damping systems are passive, the toggle-brace damping systems are arranged such that especially the first damping modes of the wind turbine ($1^{st}$ fore-aft and $1^{st}$ side-to-side) are effectively damped. In another aspect of the invention, a hybrid control of the damping systems is provided: a plurality of damping systems may comprise purely passive dampers, and at least one damping system can be actively controlled; during normal operation, the damping system is purely passive, but at a sudden load (which surpasses a certain threshold), the active damper is activated to momentarily suppress the unwanted loads.

In another aspect, the invention provides the use of a toggle-brace vibration damping system for damping vibrations in a wind turbine. In some embodiments, a plurality of toggle-brace vibration damping systems may be used. In some of these embodiments, at least one toggle-brace vibration damping system may be used for damping a first vibration mode, while at least one other vibration damping system is used for damping another vibration mode. It is also foreseen that at least one toggle-brace vibration damping system may be used for damping vibrations in a first tower segment, and at least one other vibration damping system may be used for damping vibrations in another tower segment.

DESCRIPTION OF THE DRAWINGS

Illustrative embodiments of the invention are described in detail below with reference to the attached drawing figures, and wherein:

FIGS. 1a-1b illustrate a relationship between the local displacement of a wind turbine tower structure and the displacement this causes of a damper along its longitudinal axis;

FIGS. 1c-1f depict wind turbine tower configurations in accordance with embodiments of the invention;

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Figures 1E, 1F:
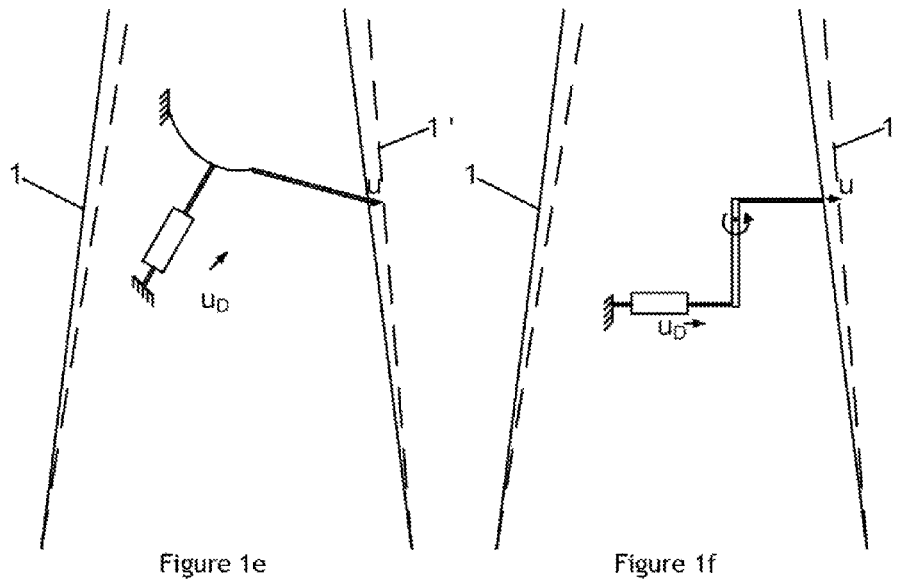
Figure 2A:
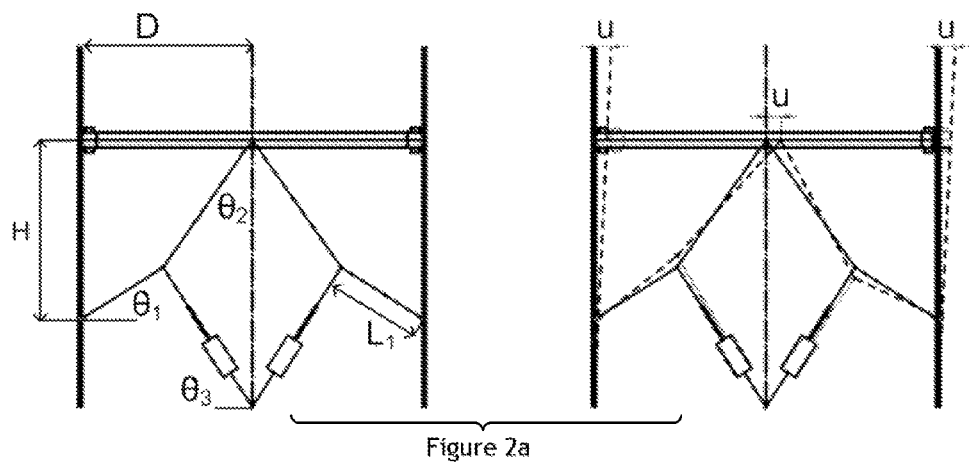
FIGS. 2a-2d illustrate a mathematical relationship between the local displacement of a wind turbine tower and the displacement this causes of a damper along its longitudinal axis in accordance with embodiments of the invention.

FIG. 2a illustrates a first embodiment of the present invention, two lower-toggle brace damper systems arranged within the tubular structure of a wind turbine tower. A lower-toggle brace damper system comprises a toggle (having two bracing elements) and a damping element linked to each other, the damping element being arranged substantially below the toggle.

As has been mentioned before, the damping force generated in damping systems does not depend directly on the local displacement of the structure, but on the relative displacement of the damper along the axis of the damper that is caused by this drift.

In general: $u_D = f \cdot u$ Eq. 1

In this equation, $u_D$ is the relative displacement of the damper along the axis of the damper, f is a magnification factor and u is the local displacement along the wind turbine tower. Similarly, the force exerted by a damper (F) on the structure is proportional to the force along the axis of the damper ($F_D$) times the same magnification factor $f: F = f \cdot F_D$. Eq. 2

The magnification factors of the toggle-brace-damper configuration shown in FIG. 2a can be determined to be:

$$f_L = \frac{\sin\theta_2 \sin(\theta_1 + \theta_3)}{\cos(\theta_1 + \theta_2)}$$ Eq. 3

It should be noted that the derivation of the magnification factor is under the assumption of small deformations and without considering axial elasticity of the braces. For a more detailed derivation of the magnification factor, the reader is referred to e.g. [Constantinou, M. C., Tsopelas, P., Hammel, W., and Sigaher, A. (2001) *Toggle-brace-damper seismic energy dissipation systems*, "Journal of Structural Engineering" 127(2): 105-112] the disclosure of which is hereby incorporated herein in its entirety by reference (in the remainder of the description referred to as "Constantinou 2001"). The detailed derivation falls outside the scope of the present patent application.

The lateral damping force $F_T$ contributed by the damper may further be determined as follows:

$$F_T = \frac{\cos(\theta_2 - \theta_3)}{\cos(\theta_1 + \theta_2)} F_D$$ Eq. 4 where $F_D$ is the damper force.

A practical non-limiting approach to determining suitable angles $\theta_1$, $\theta_2$, $\theta_3$ can be derived from [Hwang, J-S, Huang, Y-N, and Hung, Y-H (2005), *Analytical and Experimental Study of Toggle-Brace-Damper Systems*, "Journal of Structural Engineering" 127(2): 1035-1043] (in the remainder of the application referred to as "Hwang 2005"): Three dimensionless geometric parameters, $\theta_1$, $L_1/D$, and H/D may be used to define the angles $\theta_2$, $\theta_3$.

$$\theta_2 = \tan^{-1}\left(\frac{1 - \left(\frac{L_1}{D}\right)\cos(\theta_1)}{\left(\frac{H}{D}\right) - \left(\frac{L_1}{D}\right)\sin(\theta_1)}\right)$$ Eq. 5

$$\theta_3 = \tan^{-1}\left(\frac{\left(\frac{L_1}{D}\right)\sin(\theta_1)}{1 - \left(\frac{L_1}{D}\right)\cos(\theta_1)}\right)$$ Eq. 6

When the three dimensionless parameters have been determined, the magnification factor can be calculated using Eq. 3.

According to this approach, the following constraints resulting from geometric configurations of the toggle-brace-damper system need to be taken into account:

$$\theta_1 \leq \tan^{-1}\left(\frac{H}{D}\right)$$ Eq. 7

If $\theta_1$ has been selected, $L_1$ should be smaller than $D/\cos(\theta_1)$ as shown in Eq. 8:

$$\frac{L_1}{D} \leq \frac{1}{\cos(\theta_1)}$$ Eq. 8

In order to preserve the toggle-brace-damper mechanics under extreme events, the total length of the braces connecting the damper should be greater than the total diagonal length produced by the side sway motion of the both braces. Based on this constraint, the following inequality can be derived:

$$\frac{u}{H} \leq \left[\frac{L_1}{D} + \frac{\left(\frac{H}{D}\right) - \left(\frac{L_1}{D}\right)\sin(\theta_1)}{\cos(\theta_2)} - \sqrt{\left(\frac{H}{D}\right)^2 + 1}\right]\sqrt{1 + \left(\frac{D}{H}\right)^2}$$ EQ. 9

It is worth noting that the left side of Eq. 9, u/H, is exactly the "drift ratio". Therefore, for preserving the toggle-brace mechanism, the possible maximum drift ratio should satisfy Eq. 9 to prevent the two braces of the toggle-brace-damper system from becoming a straight line or even snapping through.

Based on the aforementioned constraints, the relationship between the geometric layout of a toggle-brace-damper system and the magnification factor f, with a vibration damping system design parameter H/D, can be established using the following steps:

1. Determine the range of $\theta_1$ satisfying the constraint of Equation 7;
2. Determine the range of $L_1/D$ observing the constraint of Equation 8;
3. Determine the appropriate range of the combination of $\theta_1$ and $L_1/D$ that satisfy Eq. 9 corresponding to a specified u/H; and
4. Derive the relationship between the magnification factor f and the inclined angle $\theta_1$ corresponding to different $L_1/D$ values.
5. Once the dimensionless parameters haven been determined, all parameters of the design may be determined using Eq. 5 and Eq. 6.

The method described here is based on [Hwang 2005] and has been merely described as giving one suitable and practical way of designing a vibration damping system employed in a wind turbine according to the present invention. Other design methods may however also be used.

Figure 2B:
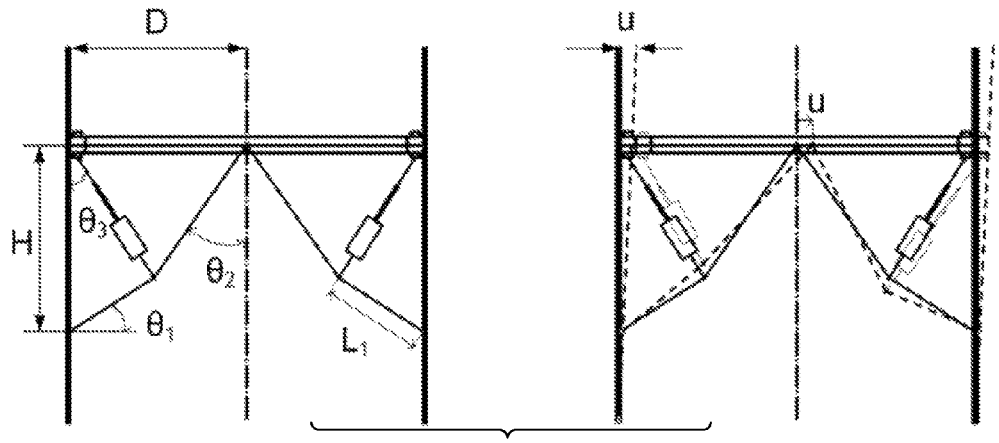

FIG. 2b illustrates a second embodiment of the present invention, two upper-toggle brace damper systems arranged within the tubular structure of a wind turbine tower. An upper-toggle brace damper system comprises a toggle (having two bracing elements) and a damping element linked to each other, the damping element being arranged substantially above the toggle. The upper-toggle bracing system follows a similar kinematic design as shown in the previous lower-toggle mechanism. The magnification factor of the upper toggle-brace damper system may be determined as follows (see, [Constantinou, 2001]):

$$f_L = \frac{\sin\theta_2}{\cos(\theta_1 + \theta_2)} + \sin\theta_1 \quad \text{Eq. 10}$$

As an example, if $\theta_1=31.9°$ and $\theta_2=43.2°$, the magnification factor f=3.191.

And the lateral damping force contributed by the damper may be determined as follows:

$$F_T = \frac{\cos(\theta_2 - \theta_3)}{\cos(\theta_1 + \theta_2)} F_D \quad \text{Eq. 11}$$

where $F_D$ is the damper force. In order to facilitate the design process, a similar rationalised procedure of the design process may be used as the one previously described an derived from [Huang 2005] for the lower toggle-brace damping system. The same dimensionless geometric parameters, $\theta_1$, $L_1/D$, and H/D may be used to represent the angles $\theta_2$, $\theta_3$.

Figure 2C:
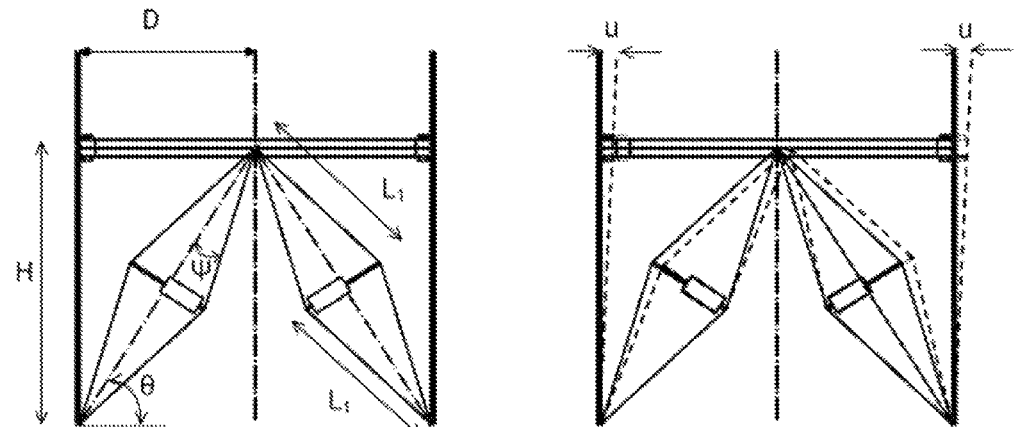

FIG. 2c illustrates a third embodiment of the present invention, two scissor-jack brace damper systems arranged within the tubular structure of a wind turbine tower.

According to [Lee, S-H., Min, K-W, Chung, L., Lee, S-K, Lee, M-K, Hwang, J-S, Choi, S-B, Lee, H-G, *Bracing Systems for Installation of MR Dampers in a Building Structure*, "Journal of Intelligent Material Systems and Structures", Vol. 18-November 2007, p. 1111-1120] (the disclosure of which is hereby incorporated herein in its entirety by reference), one arrives at a formula for the magnification factor f:

$$f = \frac{\cos\theta}{\tan\psi} \quad \text{Eq. 12}$$

As an example, with $\theta=45°$, and $\Psi=20°$, the magnification factor f=1.94.

Figure 2D:
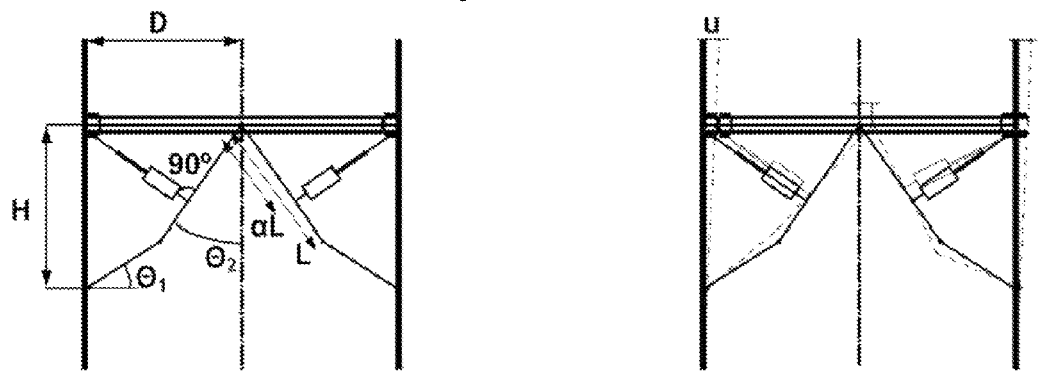

FIG. 2d illustrates a reverse toggle-brace damping systems. The reverse toggle-brace system comprises a toggle (having two bracing elements) and a damping element. The damping element is connected to one of the bracing elements (not where the two bracing elements are coupled). The damping element is thus arranged somewhat sideways of the toggle, as can be seen in FIG. 2d.

With reference to [Constantinou, 2001], the magnification factor f can be determined to be:

$$f = \frac{\alpha\cos\theta_1}{\cos(\theta_1 + \theta_2)} - \cos\theta_2 \quad \text{Eq. 13}$$

With $\theta_1=30°$, $\theta_2=49°$, and $\alpha=0.7$, the magnification factor f=2.521. It has thus far been shown that using different toggle-brace configurations, the local displacement of a wind turbine tower structure causes an increased displacement of the damper along its longitudinal axis. Thus, the previously shown configurations are in principle very suitable for effectively damping vibrations: even a small displacement may lead to a high damping force.

Figure 3A:
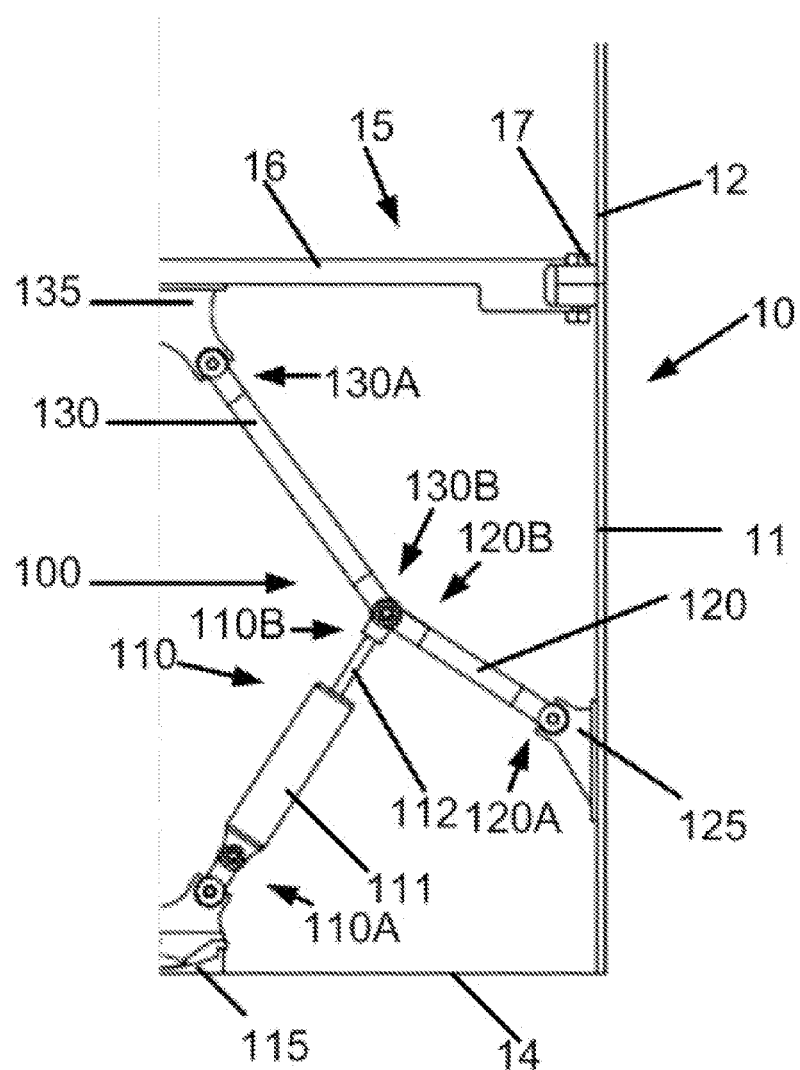
FIGS. 3a-3f illustrate an embodiment of a wind turbine tower in accordance with an embodiment of the invention.

FIGS. 3a-3f illustrate an embodiment of a wind turbine tower according to the present invention. In FIG. 3a, a cross-sectional view of a single vibration damping system is shown.

The wind turbine tower 10 in this embodiment comprises at least two tubular tower segments 11 and 12. Flanges of the tower segments 11 and 12 are connected to each other by a plurality of bolts 17. An intermediate structure 15 in this embodiment furthermore comprises at least one beam 16 extending from one side of the tower to the other.

Vibration damping system 100 comprises three elements 110, 120 and 130. Damping element 110 comprises damper 111. Brace 112 is supported in friction pendulum bearing system 115 mounted upon support 14. Bracing element 120 is hingedly connected to a tower attachment 125. Attachment 135 which is mounted on intermediate structure 116 hingedly supports bracing element 130. Bracing elements 120 and 130 form a so-called "brace-toggle": a device consisting of two braces jointed together end to end, but not in line. A characteristic of such a toggle is that if a force is applied to straighten it, pressure will be exerted on the parts adjacent to or fixed to the outer ends of the braces (i.e. in this case, the attachments 125 and 135 and thus the wind turbine tower segment 11). Even though the toggle-brace is described here as two braces which are not in line, it should be noted that, in use and under extreme loading, the braces 120, 130 may possibly, temporarily, be in line.

Bracing elements 110, 120 and damping element 130 are hingedly connected to each other with a pin. The elements 110, 120, 130 are mounted within the wind turbine tower (through attachments 115, 125 and 135) at their first ends 110A, 120A, 130A, and are connected to each other at their second ends 110B, 120B, 130B.

Figures 3C, 3D:
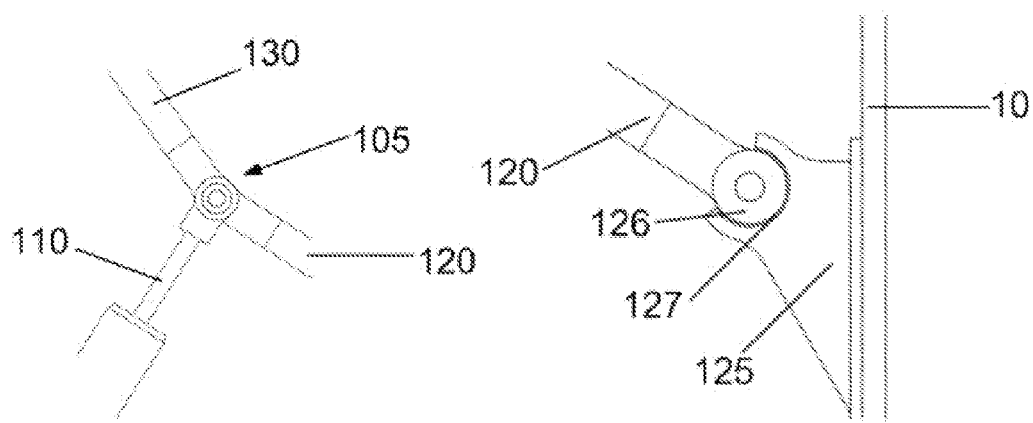
Figure 3B:
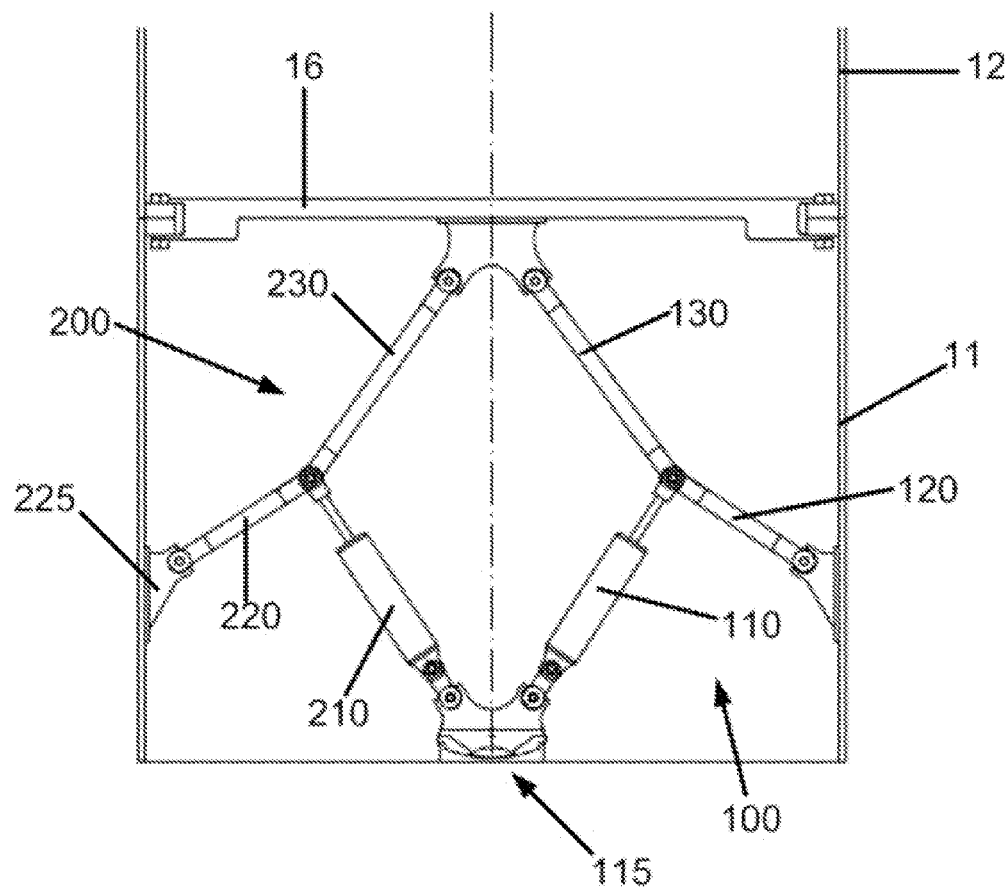

In FIG. 3b, two vibration damping systems are shown within the same wind turbine tower. First vibration damping system 100 comprises damping element 110 and toggle 120-130, and second vibration damping system 200 comprises damping element 210 and toggle 220-230. Both vibration damping systems are similarly arranged through attachments to the beam 16 and to the tubular structure of tower segment 11. The two damping systems 100 and 200 are coupled to each other at friction pendulum bearing system 115, located along a central axis of the tower structure. By coupling the two damping systems to each other, the forces of one damping system are transferred to the other damping system. Also, in this way, the plurality of damping systems can be mounted at a single point: in FIG. 3(b), there is only one mounting point at beam 16.

Within the scope of the present invention, the number of damping systems linked to each other in such a way may be varied. FIG. 3f illustrates an embodiment of the invention, wherein three damping systems 100, 200 and 300 are linked at friction pendulum bearing system 115. (It should be noted that FIG. 3f does not show a top view of the embodiment of FIG. 3b, it shows an alternative embodiment). The three damping systems in FIG. 3f are radially arranged, allowing 120° angles between them.

Further illustrated in FIG. 3f are a space 90 for e.g. an elevator or stairs and a space 80 for e.g. electrical cables. It is thus illustrated in FIG. 3f that a plurality of damping systems may be arranged at the same height along the tower and enough space will still be available within the tower for auxiliary systems. Within the scope of the present invention, instead of three, any other number of damping systems may be used, such as e.g. one, two, four or five. Within the scope of the present invention, different numbers of damping systems may further be arranged along the height of the tower. At one height, e.g. three damping systems may be linked to each other, whereas at a second height, four damping systems are provided. Providing three or more damping systems at the same height allows damping in any desired direction, and e.g.

allows damping of asymmetric vibrations caused by nacelle imbalances or rotor movements.

Figure 3E:
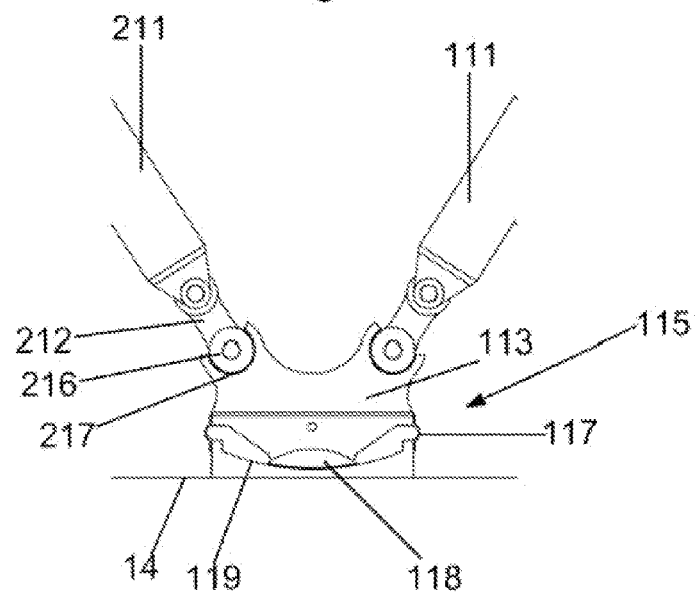
Figure 3F:
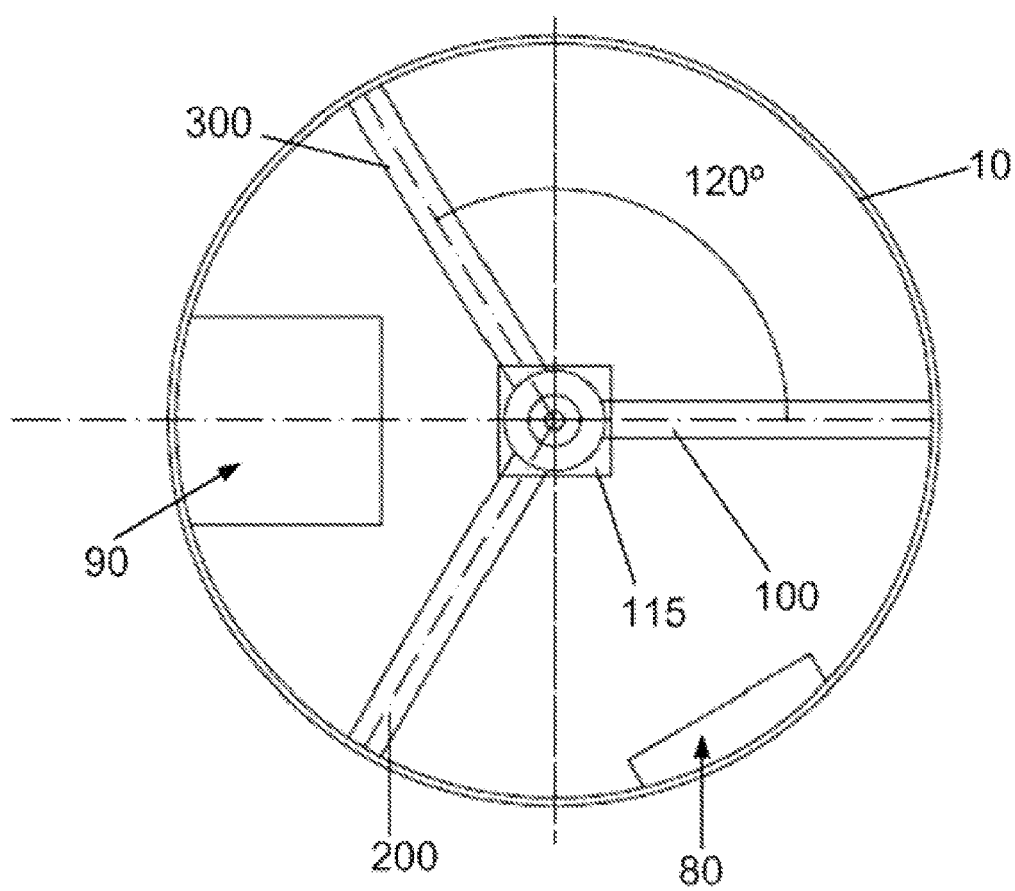

FIGS. 3c, 3d and 3e highlight some details of the vibration damping system 100 shown in FIG. 3a. FIG. 3c highlights pin 105 that connects elements 110, 120 and 130 at their second ends. In an aspect of the invention, said pin may be made of e.g. stainless steel or strengthened steel. The elements are thus hingedly arranged with respect to each other.

FIG. 3d highlights the attachment 125 at first end of bracing element 120. Spherical bearing 126 is arranged with a visco-elastic joint 127 in attachment 125.

FIG. 3e shows the friction pendulum bearing 115 that couples damping elements 110 and 210 (their respective dampers have been indicated with reference signs 111 and 211). Brace 212 of element 210 is arranged with a spherical bearing 216. A visco-elastic joint 217 is arranged between the spherical bearing 216 and coupling element 113. Coupling element 113 is the link between damping systems 100 and 200 and couples elements 111 and 211 to slider 118. The viscoelastic joint is especially suitable for transferring the loads to the bearing. Within the scope of the present invention however, such a viscoelastic joint may be left out or substituted with any other suitable joint.

The friction pendulum bearing 115 shown in FIG. 3e works as follows: When the tower is vibrating, the elements of the damping systems will move, which will cause the coupling element to slide with slider 118 within three-dimensionally concave surface 119. Friction pendulum bearing systems are used to isolate the vibrations in a structure. Due to the fact that the slider 118 can move within the concave surface 119, the bearing moves, but the structure supporting the bearing moves much less. A suitable material for the slider 118 may be Teflon™ and a suitable material for the concave surface 119 may be stainless steel. Other materials may also be used. By changing the materials, the friction coefficient of the pendulum bearing system may be influenced. Further shown in FIG. 3e is a sealing 117 which seals off the slider 118 and concave surface 119 from the outside, such that wear due to dust, impurities, moist etc. may be reduced. As can be seen in FIG. 3e, slider 118 has on one side a substantially spherical surface to support coupling element 113. On its other side, it has a shape which complements the concave surface 119 in order to slide smoothly within said surface 119.

In this embodiment, the friction pendulum bearing system is a single friction pendulum bearing system (with a single "slider") was shown. Within the scope of the present invention however, other friction pendulum bearing systems may also be used, such as a double concave pendulum bearing system (with two "sliders") or a triple pendulum bearing system (with three "sliders").

Figure 4A:
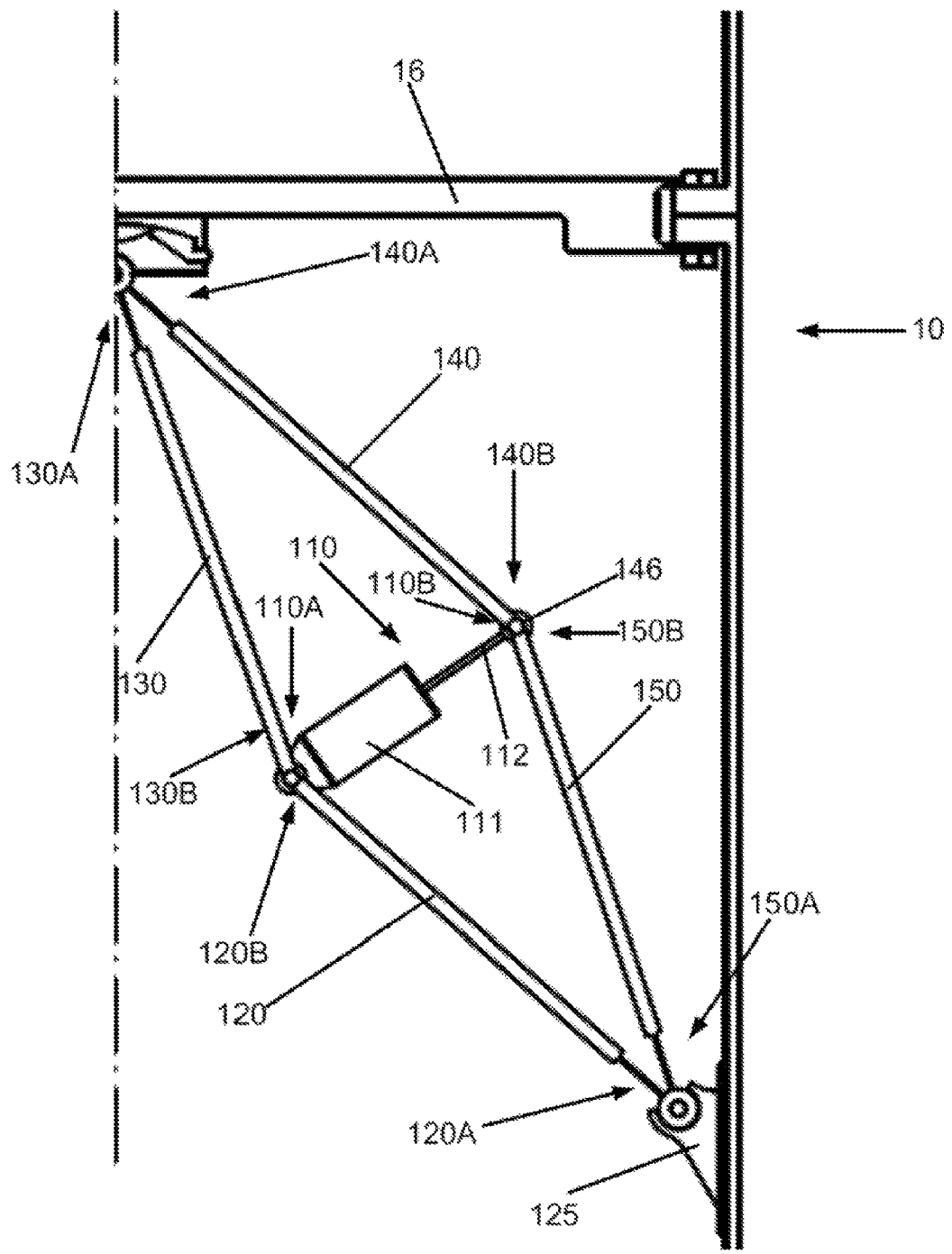
FIGS. 4a-4d illustrate another wind turbine tower in accordance with an embodiment of the invention.

FIGS. 4a-4d illustrate another embodiment of a wind turbine tower according to the present invention. In FIG. 4a, a cross-sectional view of a single vibration damping system is shown. Vibration damping system 100 comprises a first toggle (having bracing elements 120 and 130) and a second toggle (having bracing elements 140 and 150) and a damping element 110. Damping element 110 comprises a damper 111 and a brace 112. Elements 120, 130, 140 and 150 are hingedly mounted within the tower at their first ends 120A, 130A, 140A and 135A and they are hingedly linked to each other and to damping element 110 at their respective second ends 120B, 130B, 140B and 150B. The embodiment shown in FIG. 4a is generally referred to as a scissor-jack toggle-brace damping system.

Figure 4B:
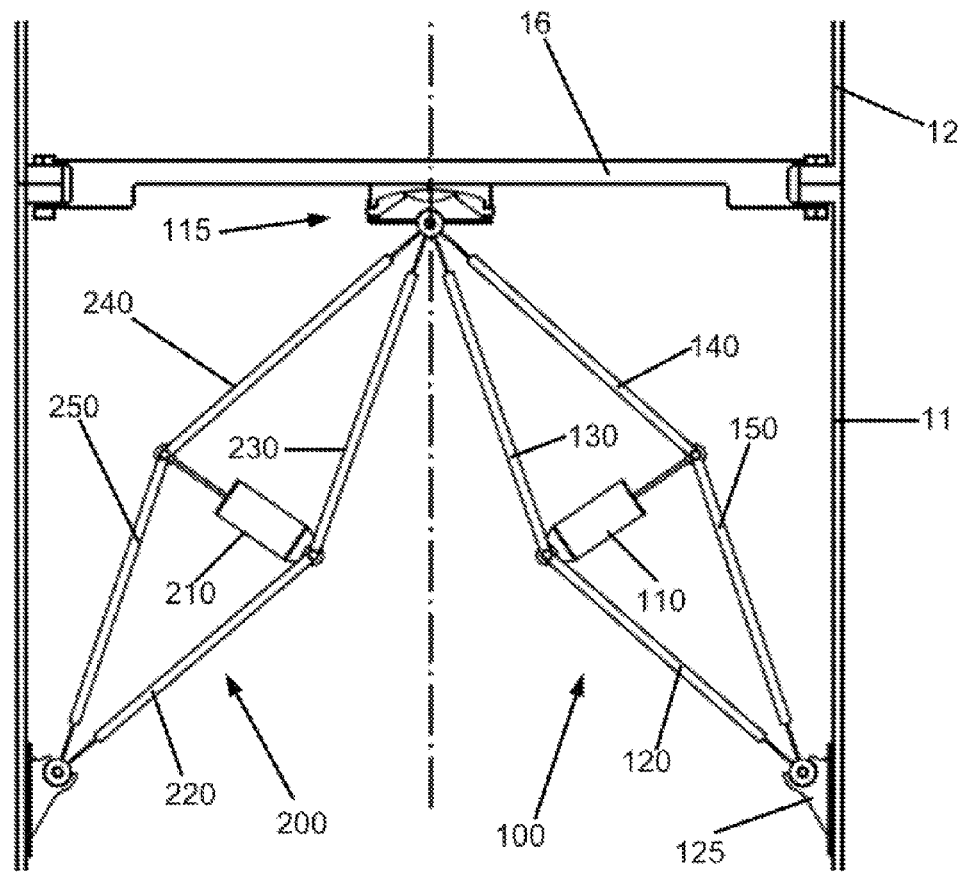

FIG. 4b shows two damping systems 100, 200 coupled to each other at friction pendulum bearing system 115. Friction pendulum bearing system 115 is mounted on beam 16 arranged at the intersection of tower segments 11 and 12. Within the scope of the present invention however, the damping systems may be arranged at any height along the wind turbine tower.

Figure 4C:
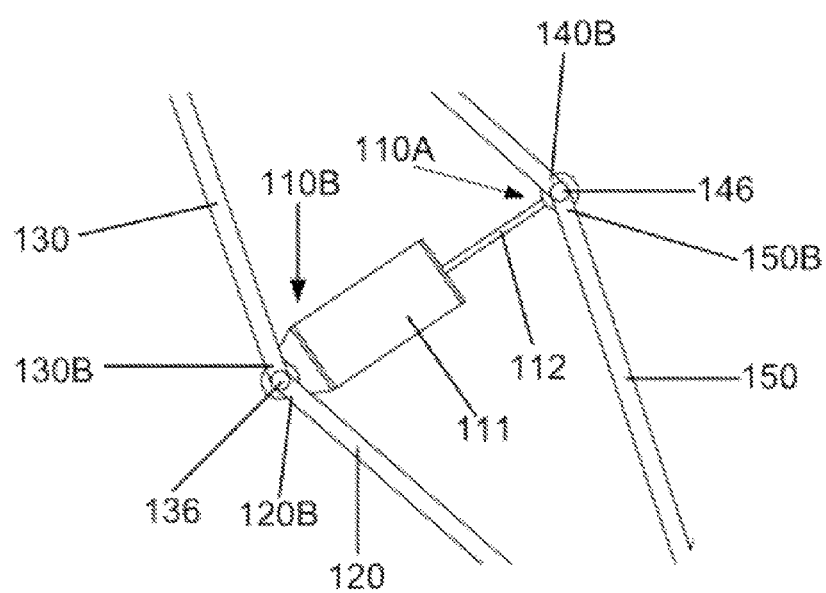

FIG. 4c highlights how elements 110, 120 and 130 are linked at their second ends 110B, 120B and 130B by a pin 136. Second ends 140B and 150B of bracing elements 140 and 150 are linked to first end 110A of damping element 110 at pin 146.

Figure 4D:
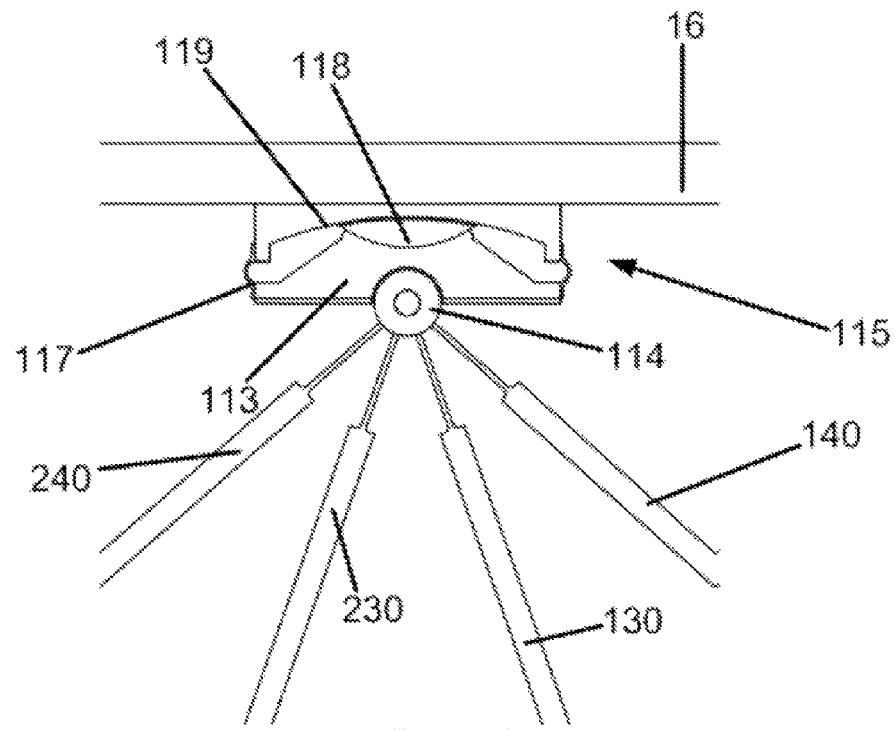

FIG. 4d highlights friction pendulum bearing system 115. At spherical bearing 114, bracing elements 130 and 140 of first bearing system are hingedly connected. At the same spherical bearing, elements 230 and 240 are hingedly connected. The two damping systems 100 and 200 are thus coupled at coupling element 113. Coupling element 113 is arranged with slider 118, in a similar way as the bearing system shown in FIG. 3e.

Figure 5:
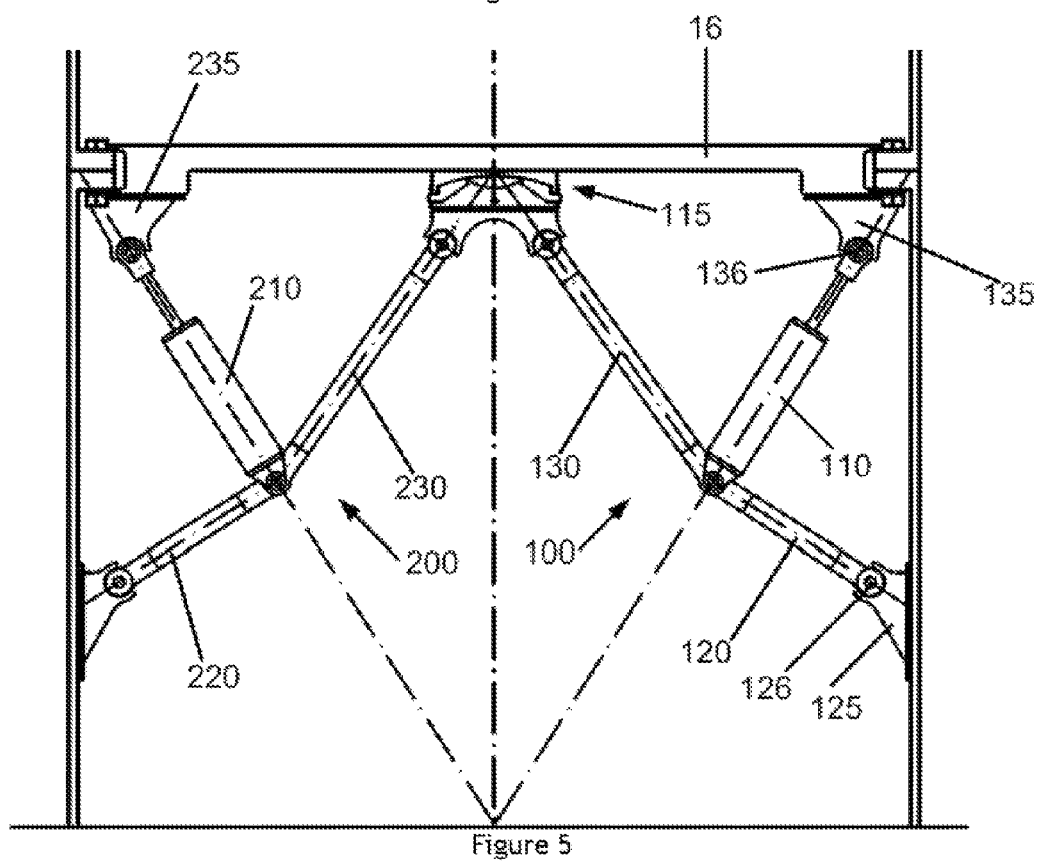
FIG. 5 shows yet another wind turbine tower in accordance with an embodiment of the invention.

FIG. 5 shows a cross-sectional view of yet another embodiment of a wind turbine tower according to the present invention. Two so-called "upper-toggle" brace damping systems 100 and 200 are shown. Damping system 100 comprises damping element 110, and bracing elements 120 and 130. The damping element 110 is arranged substantially above the toggle 120-130. Bracing element 120 is hingedly connected to the wind turbine tower with spherical bearing 126 arranged in attachment 125. Bracing element 130 at its first end also comprises a ball bearing 136 arranged in attachment 135. Attachment 135, in this embodiment, has been advantageously connected to beam 16. Damping systems 100 and 200 are coupled to each other at friction pendulum bearing system 115 arranged centrally in the tower. The friction pendulum bearing system 115, in this embodiment, is also advantageously mounted in intermediate structure 16 arranged between two tower segments.

Figure 6A:
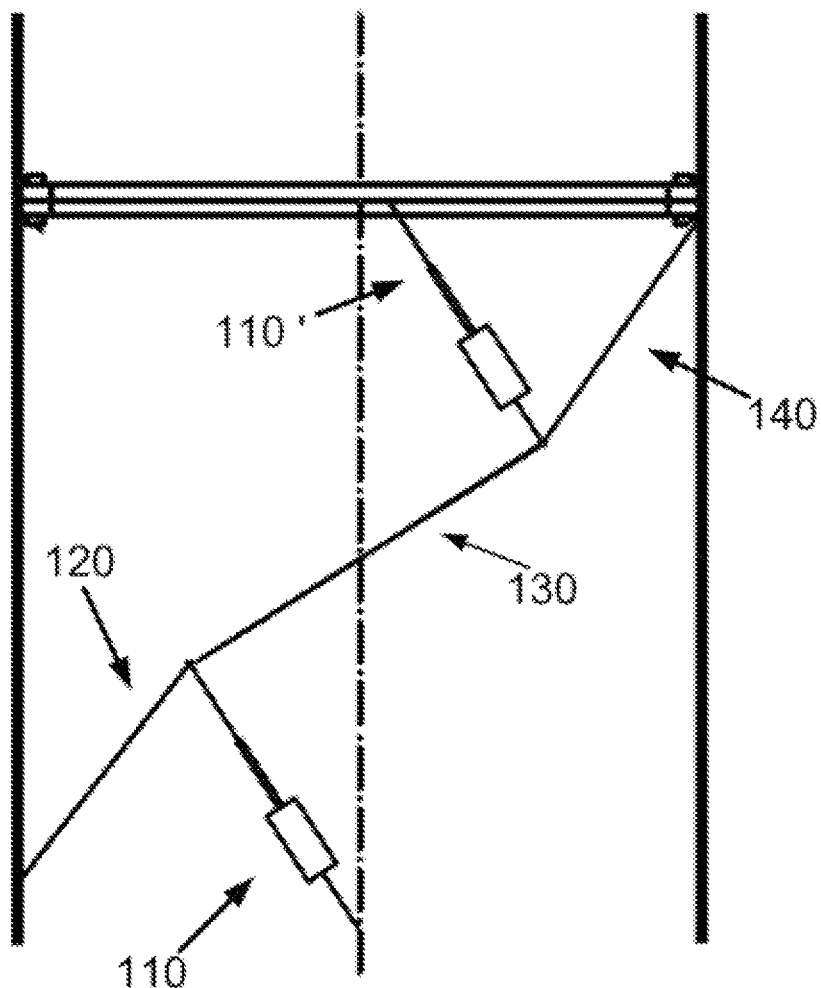
FIGS. 6a and 6b show additional wind turbines in accordance with an embodiment of the invention.
Figure 6B:
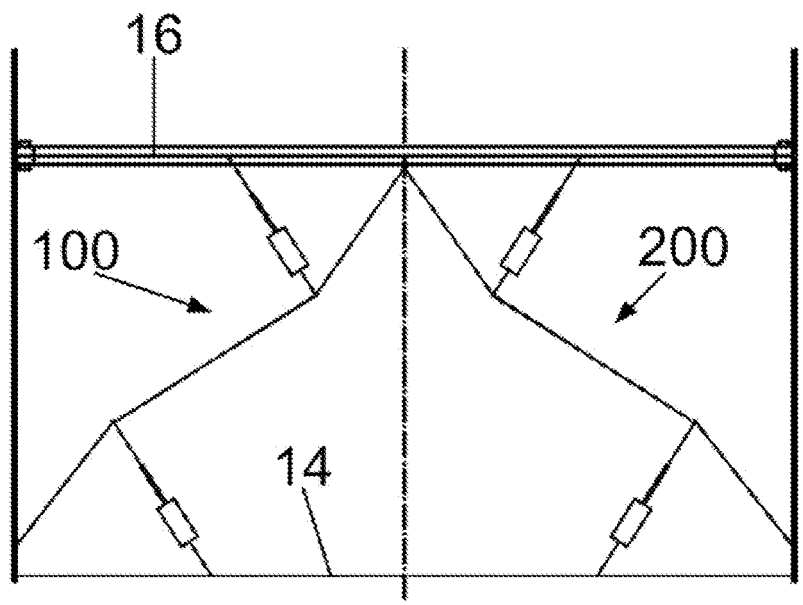

FIGS. 6a and 6b illustrate two further embodiments of wind turbines according to the present invention. The vibration damping system 100 shown in FIG. 6a is another from of a toggle-brace vibration damping system, a so-called "double" toggle-brace. The double toggle-brace 100 comprises two damping elements 110 and 110' and three bracing elements. The first bracing element 120 and second bracing element 130 form a first toggle. Second bracing element 130 and third bracing element 140 form the second toggle. The two toggles are arranged in line. An aspect of the double toggle-brace damping system is that even if, under an extreme load, a first part of the double toggle were to snap through, the second part would still function as a toggle-brace.

In the embodiment of FIG. 6a, a double-toggle brace vibration damping systems spans the diameter of the wind turbine tower. In the embodiment of FIG. 6b, two double toggle-brace vibration damping systems 100, 200 are coupled in an area positioned substantially at a central axis of the tower structure.

In FIGS. 3-6, all damping elements 110, 210 were shown to comprise a damper having a length of approximately 50-60% of length of the damping element. In other embodiments of the invention, this ratio may be different, e.g. 10% or even close to 100%. Said ratio (or said length of the damper) may depend on e.g. the amount of vibrations to be damped, the type of damper, the damping coefficient of the damper, the physical dimensions of the damping system etc.

Figure 7:
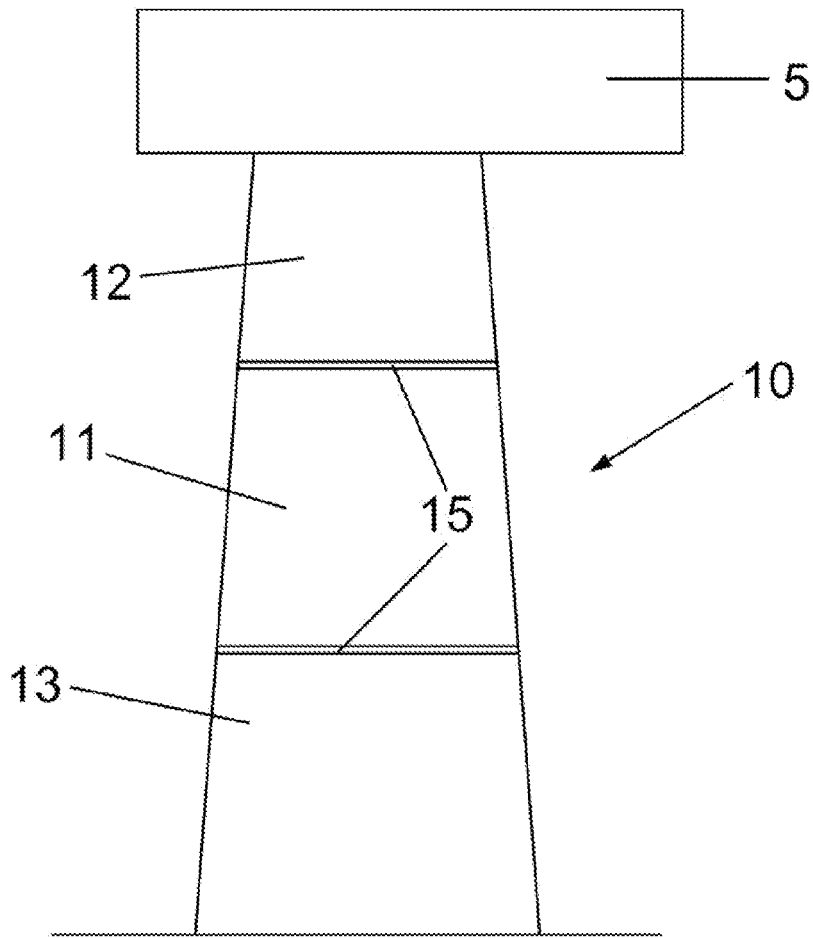
FIG. 7 shows a wind turbine tower in which the invention may be advantageously used.

FIG. 7 schematically shows a wind turbine tower, in which the methods and systems according to the present invention may advantageously be used. Due to their increased size, wind turbine towers nowadays comprise various segments. Splitting the tower into various segments facilitates e.g. their transport to site and their manufacture. Wind turbine tower 10 e.g. comprises a bottom tower segment 13, an intermediate tower segment 11 and a top tower segment 12. The tower segments are connected to each other through intermediate structures 15. On top of the tower, schematically indicated, a nacelle 5 is arranged.

In FIGS. 3, 4 and 5, the damping systems were shown to be arranged in tower segment 11, but the invention is not limited in this sense. In use, the vibrations occurring in the various segments may be slightly different. The top tower segment 12 may have a reduced thickness compared to bottom tower segments 13. This will have an effect on the occurrence and intensity of vibrations. The influence of the wind turbine blades passing along the tower may also not be the same for each tower segment. To be able to damp vibrations of different vibration modes occurring in various segments of the tower, damping systems may be arranged in e.g. a top tower segment, or in a bottom tower segment, in all segments, or in a number of available segments.

In an aspect of the invention, one or a plurality of damping systems (e.g. lower toggle type) may be arranged in the upper tower segment 12, whereas one or a plurality of damping systems of another type (e.g. upper toggle type) may be arranged in intermediate tower segment 11. An aspect of the invention is that the number and type of damping systems may be varied along the tower and the damping vibration may thus be fine tuned for every wind turbine tower. At one height, the damping systems may be arranged to damp a first mode of vibrations, whereas at a different height along the tower, another mode of vibrations is damped.

Figure 8A:
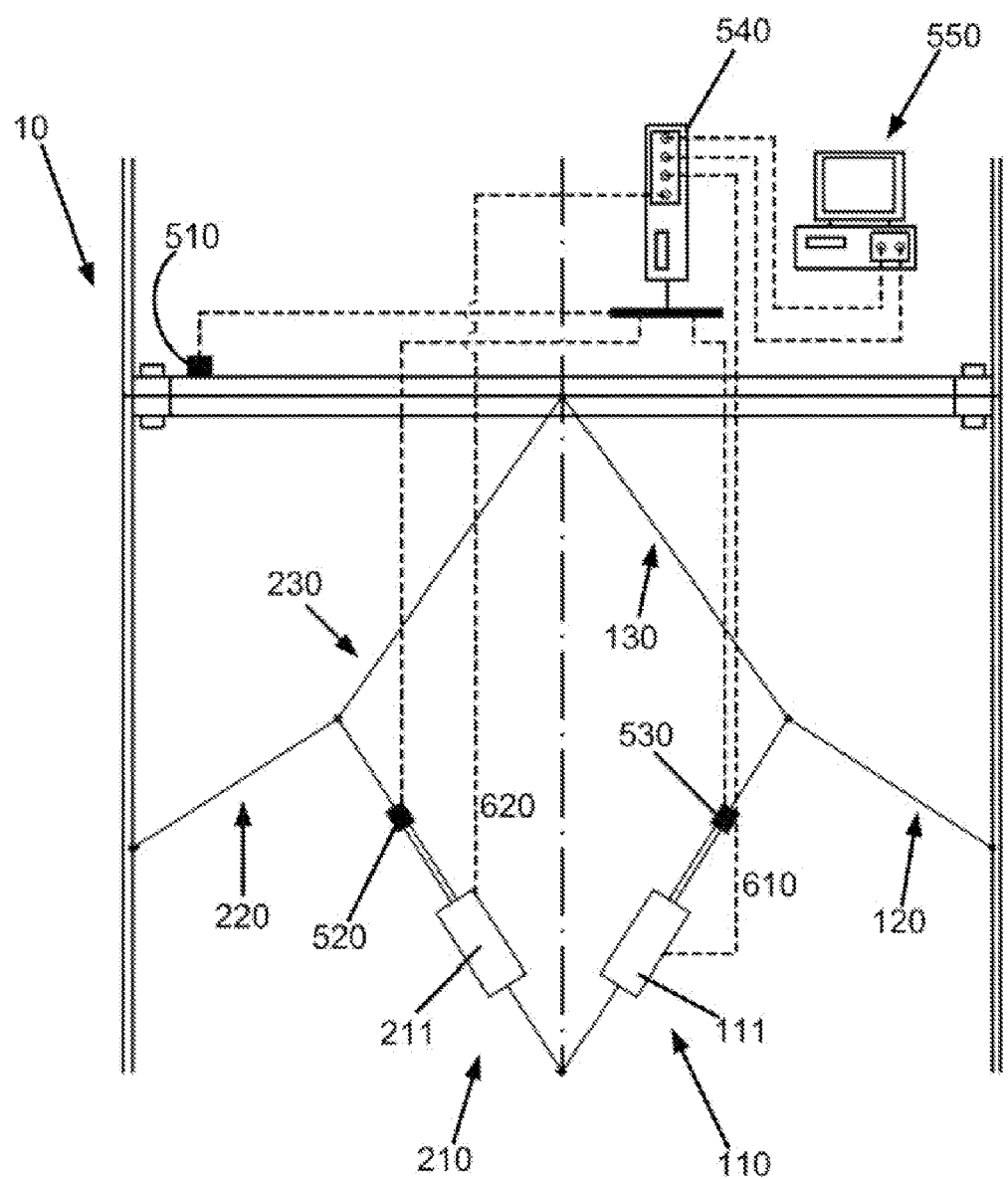
FIGS. 8a-8c illustrate some methods of damping vibrations in a wind turbine tower in accordance with embodiments of the invention.
Figure 8B:
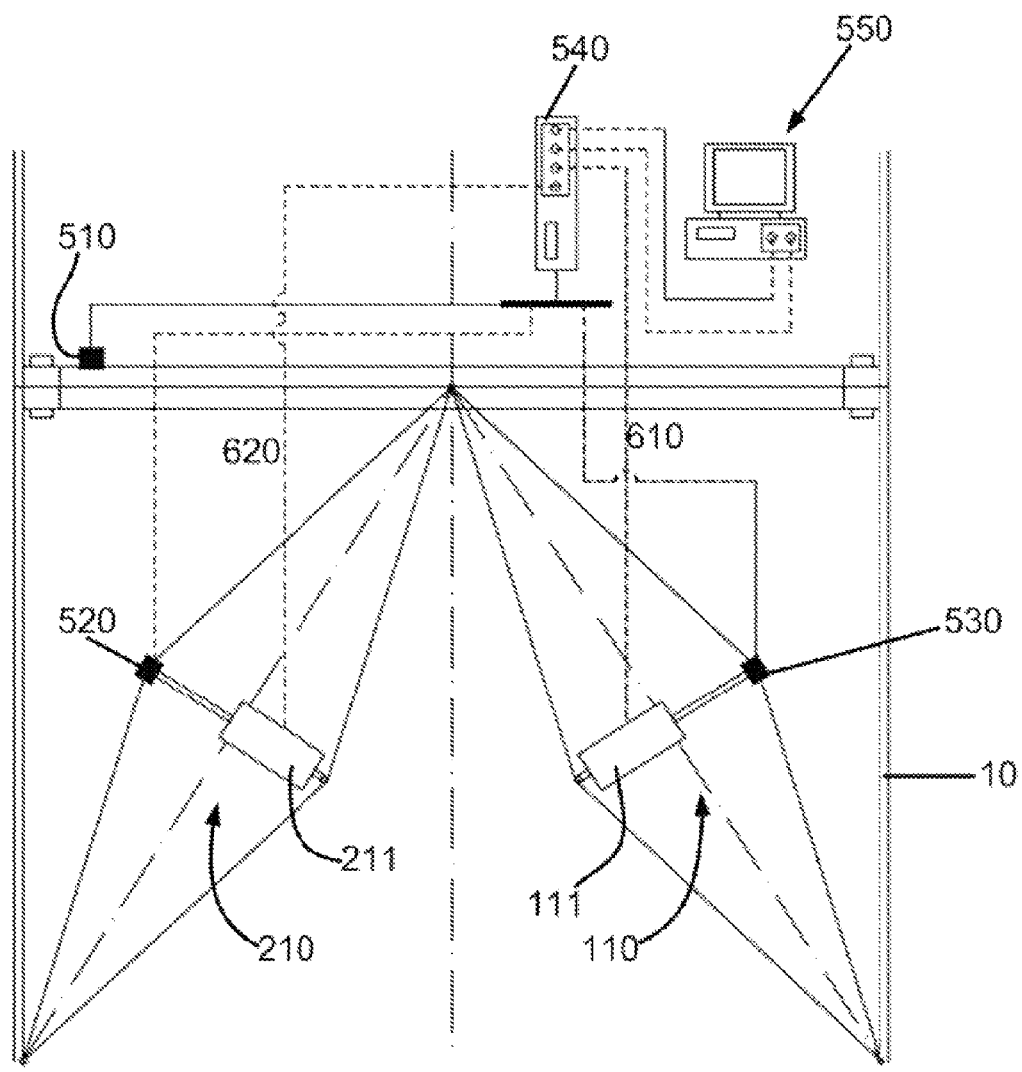
Figure 8C:
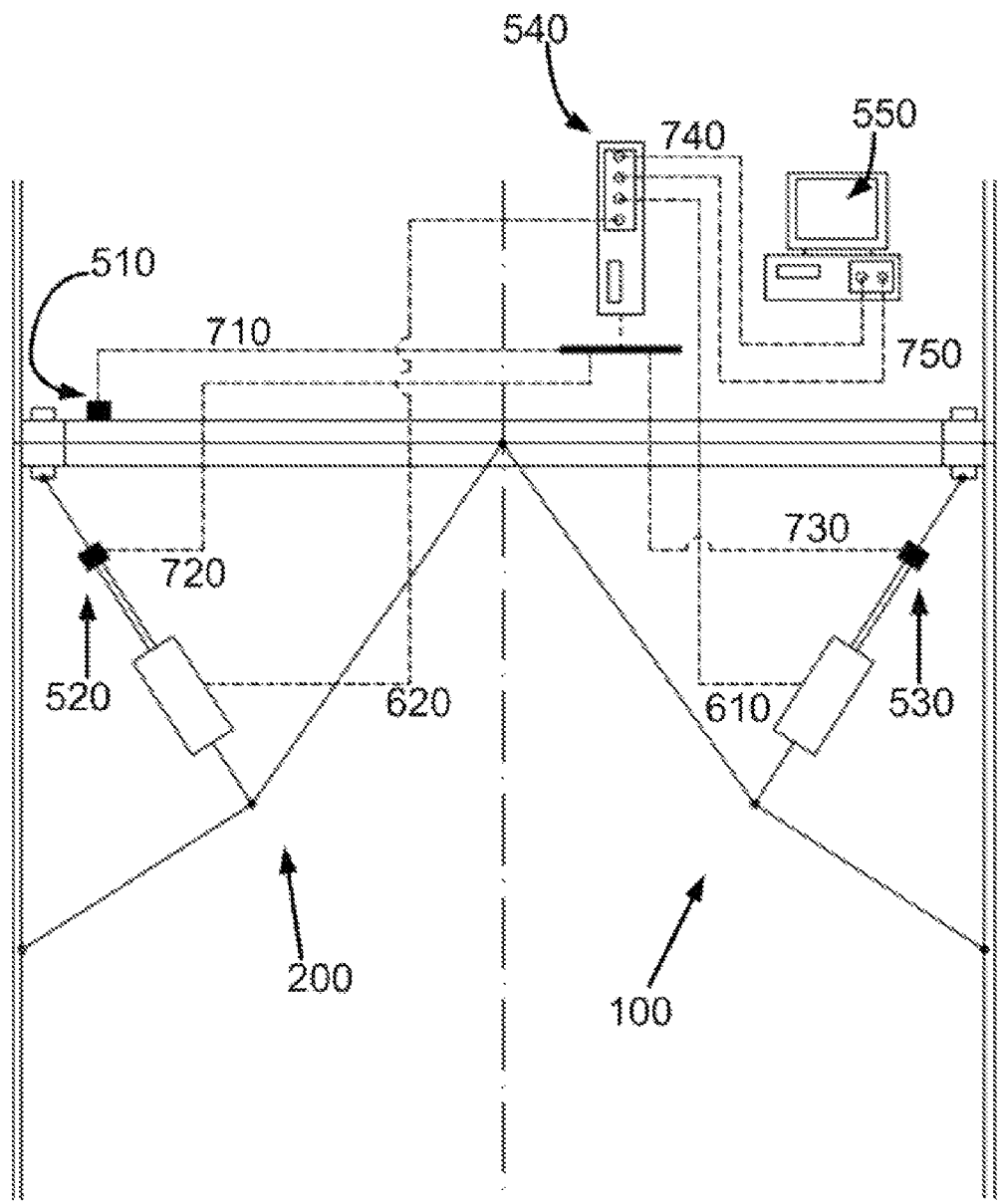

FIGS. 8a-8c illustrate some methods of damping vibrations in a wind turbine tower according to the present invention. The dampers 110, 210 used in the damping systems may be varied within the scope of the present invention. In one aspect, they may be viscous fluid dampers. Any kind of damper (e.g. hydraulic, pneumatic, solid friction, rotational inertia-viscous dampers, rotational friction dampers etc.) may be used within the scope of the present invention. The dampers may be passive, semi-active or active.

A passive damper system will have a non-variable damping coefficient. In a semi-active damper system, the damping coefficient may be varied with a control system. In an active damper system, the damper is actively steered, e.g. by increasing or decreasing pressure in one of the fluid chambers. A semi-active damper system may be formed e.g. by a variable-orifice viscous damper, a variable stiffness damper, a variable-friction damper or a controllable fluid damper. A preferred controllable fluid damper is a magnetorheological fluid damper. In magnetorheologial fluid dampers, the damper fluid contains metallic particles. The damper's damping coefficient can be controlled by an electro-magnet. A control system may thus send control signals to an electromagnet which can increase or decrease the damping coefficient.

Another controllable fluid damper that may advantageously be used is e.g. an electrorheological fluid damper. Electrorheological fluids are suspensions of fine non-conducting particles in an electrically insulating fluid. The viscosity of these fluids may be changed reversibly and very quickly in response to an electric field. In such a damper, the friction coefficient can thus be varied by applying an electric field.

The damping systems may be either passive, semi-active or active. In one aspect of the invention, within the same wind turbine tower, a hybrid system comprising a combination of passive and semi-active or active damping systems may be provided.

In FIG. 8a, two lower-toggle brace damping systems are arranged within wind turbine tower 10. A first sensor 510 is arranged at an intermediate structure between two tower segments. A second sensor 520 is arranged at damping element 210 which comprises a damper 211. And a third sensor 530 is arranged at damping element 110 comprising a damper 111. The three sensors 510, 520, 530 may measure e.g. displacement, stress or strain. The signals from the sensors are sent to an input/output unit 540, who sends the signals on to control system 550 (schematically indicated as a computer in FIG. 7a). The control system can, based on these sensor signals, send control signals to the two dampers 111 and 211 and e.g. activate an electromagnet to change the damping coefficient of a magnetorheological or electrorheological fluid damper or to actively control e.g. damper 111.

In this embodiment, three sensors were arranged with the control system. In other embodiments of the invention, more sensors, or less sensors may be used. For example, a plurality of sensors may be arranged along the wall of the wind turbine tower. Furthermore, the sensors may be of different type e.g. displacement sensors, acceleration sensor, stress sensors, strain sensors and may be based on different technologies e.g. magnetic, optical, inertia, inductive etc.

FIG. 8b illustrates a similar control system, but with scissor-jack toggle brace damping systems. Sensors 520 and 530 are arranged at the end of damping elements 210 and 110 respectively, at the junction with the other elements of the toggle brace damping systems. The displacement of the damper directly determines the amount of vibration damping achieved. Placing the sensors at the indicated locations, displacement of the damper may easily be registered. However, within the scope of the invention, the sensors may also be placed in other positions.

FIG. 8c will be used to illustrate the signals of the control system. A first signal 710 from sensor 510 is sent to input/output unit 540. A second and third signal 720, 730 from respectively sensors 520 and 530 are also sent to input/output unit 540. The collected signals are sent to control system 550 with a signal 740. Control system 550 processes the information and calculates the suitable control signals and responds by sending signal 750 to input/output unit 540. Input/output unit 540 sends command signals 610 and 620 to the respective dampers. In some embodiments, these control signals may be e.g. the current to be applied to an electromagnet in a magnetorheological fluid damper or a pressure for an active hydraulic damper.

In the FIGS. 8a-8c, the input/output unit 540 was shown separately from control system 550. It will be clear however that the control system 550 and input/output unit 540 may also form one integral component. The control system 550 may further be positioned in the nacelle of the wind turbine or anywhere else in the wind turbine and may even be remotely located, external to the wind turbine. Further, in some embodiments, a separate control system 550 may be provided for a single damping system or for a cluster of damping systems that are coupled. In other embodiments, a single control system may be provided for steering all controllable dampers arranged within the wind turbine (in some embodiments of the invention, a plurality of semi-active or active damping systems is combined with a number of passive damping systems).

Figure 9A:
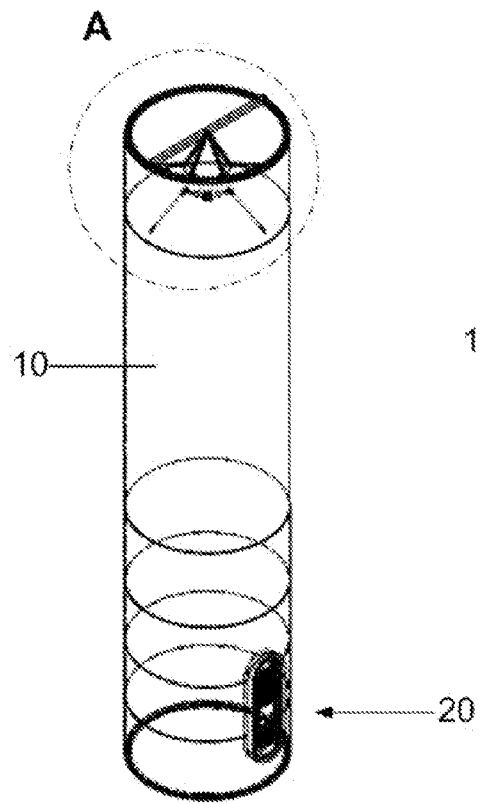
FIGS. 9-12 illustrate some embodiments of the present invention using some isometric views and cross-sections.
Figure 9B:
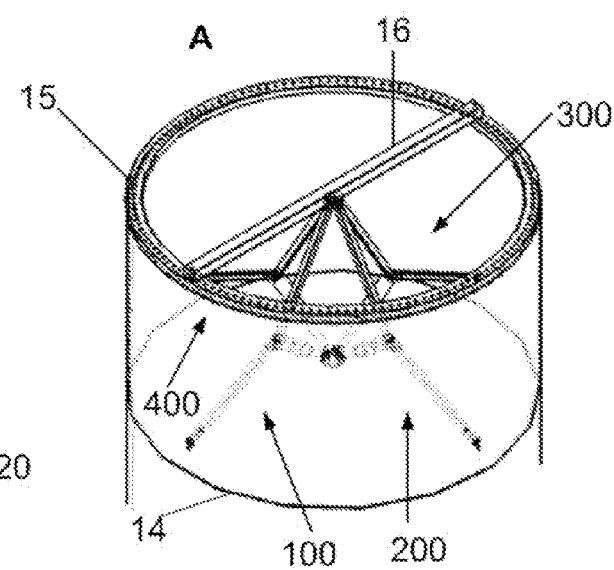

FIG. 9a shows an isometric view of a wind turbine according to the present invention. The wind tower comprises a tower 10 with a door 20 giving access to the interior of the tower. FIG. 9b gives a better view of detail A indicated in FIG. 9a. In FIG. 9b, the four damping systems 100, 200, 300 and 400 can clearly be seen. All damping systems are lower-toggle brace vibration damping systems. They are mounted at beam 16 which is arranged at intermediate structure 15 between two tower segments. The four damping systems are coupled to each other at friction pendulum bearing 115.

Figure 9C:
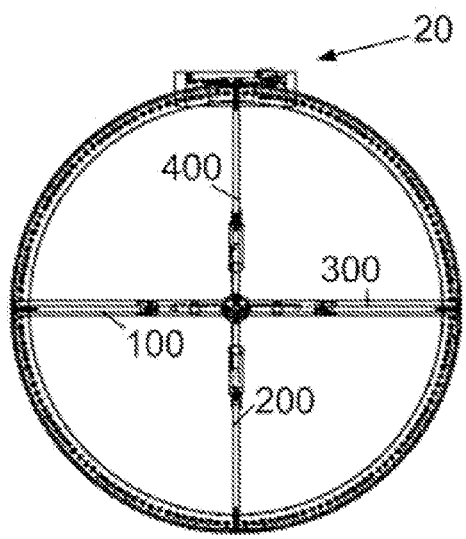
Figure 9D:
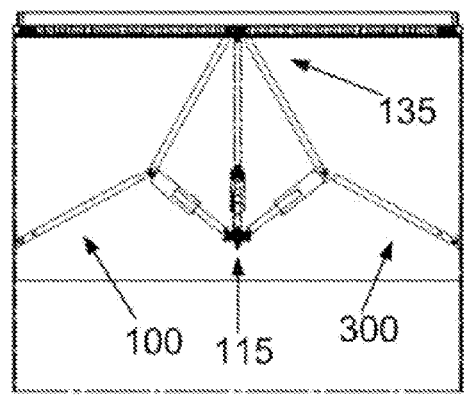

FIGS. 9*c* and 9*d* give a top view and side view of the same embodiment. It can further be recognized in FIGS. 9*a* and 9*d*, that a tower segment may comprise a plurality of welded tower rings. The same is shown in FIGS. 10 and 11.

Figure 10A:
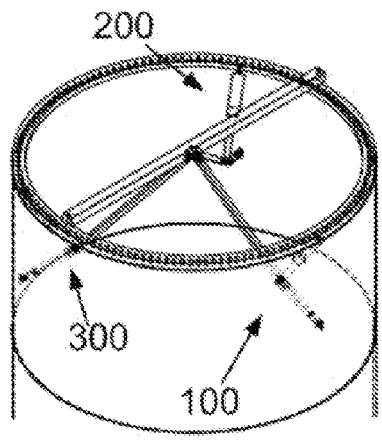
Figure 10B:
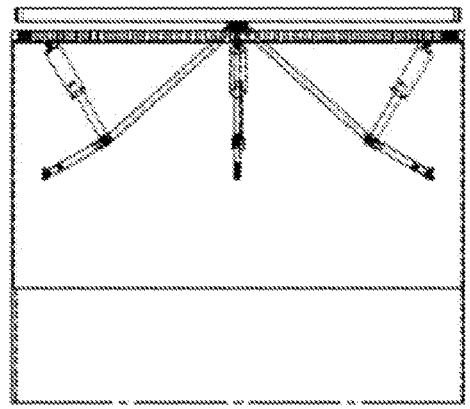

FIG. 10*a* is an isometric view of another embodiment. This embodiment comprises three upper-toggle brace damping vibration systems 100, 200 and 300. The damping systems are shown to be mounted at the same beam as shown in FIG. 9. FIG. 10*b* shows a cross-sectional view of the same embodiment.

Figure 11A:
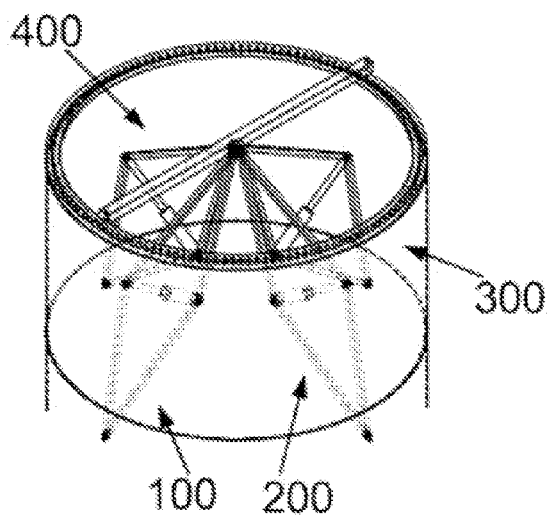
Figure 11B:
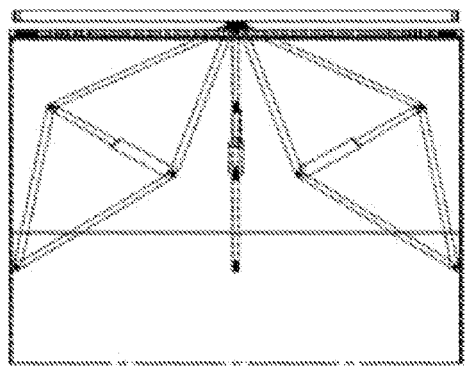
Figure 12:
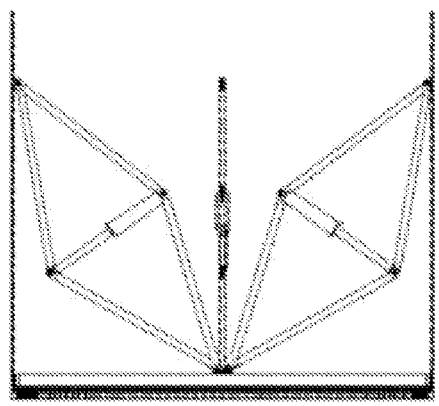

FIGS. 11*a* and 11*b* show an isometric and a cross-sectional view of embodiment comprising four scissor-jack vibration damping system. In FIGS. 9, 10 and 11, all vibration damping systems are arranged below a beam 16 at an intermediate structure. The damping systems in these embodiments thus are used to damp vibrations in the tower segment arranged below the beam. It should be clear however, that an embodiment as shown in FIG. 12, wherein the damping systems are arranged to be mounted from the beam upwards is also possible. The damping systems in this embodiment are thus arranged to damp vibrations in a tower segment arranged above said beam. In some embodiments of the invention, at the same intermediate structure, a first number of vibration damping systems may be arranged above the beam and a second number of vibration damping may be arranged below the same beam.

Throughout this application, reference has been made to a substantially tubular tower structure. In all figures, this tubular structure was shown to have a cylindrical cross-section. It should be understood however, that within the scope of the present invention, the substantially tubular structure may also have an elliptical or substantially elliptical cross-section along at least a part of the height of the wind turbine tower.

Throughout this application, various components have been described to be hingedly arranged with respect to another component. This is to be interpreted as any joint that holds two parts together, but allows one of the components to rotate relative to the other about the hinge. A hinge in this sense may thus refer e.g. to a spherical bearing arrangement or a simple pivoting hinge.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described before, but should be determined only by a fair reading of the claims that follow.

The invention claimed is:

1. A wind turbine comprising a substantially tubular tower structure having a plurality of substantially tubular segments, an intermediate structure where two of the plurality of tubular segments are joined, and one or more toggle-brace vibration damping system;
   the toggle-brace vibration damping system including a plurality of bracing elements and a damping element,
   one of the bracing elements being connected to the tower structure, and
   at least one element of the one or more vibration damping system is supported at the intermediate structure.

2. The wind turbine of claim 1, wherein the toggle-brace vibration damping system comprises a damping element and a toggle having two bracing elements,
   the bracing elements being mounted within the wind turbine tower at their respective first ends and being connected to each other at their respective second ends, the damping element being mounted within the wind turbine at its first end, and at its second end being connected to the respective second ends of the bracing elements.

3. The wind turbine of claim 2, wherein the bracing elements of at least one of the vibration damping systems are hingedly mounted at their first ends.

4. The wind turbine of claim 3, wherein the bracing elements are hingedly mounted at their first ends using spherical bearing elements.

5. The wind turbine of claim 2, wherein the bracing elements of the at least one vibration damping system are hingedly connected at their second ends.

6. The wind turbine of claim 1, wherein the toggle-brace vibration damping system comprises a damping element and a toggle having two bracing elements,
   the bracing elements being mounted within the wind turbine tower at their respective first ends and being connected to each other at their respective second ends,
   the damping element being mounted within the wind turbine at its first end, and at its second end being perpendicularly connected to one of the bracing elements.

7. The wind turbine of claim 1, wherein the toggle-brace vibration damping system comprises a damping element and a first and second toggle, each toggle having two bracing elements,
   the two bracing elements of the first toggle being mounted within the wind turbine tower at their respective first ends and being connected to each other at their respective second ends,
   the two bracing elements of the second toggle being mounted within the wind turbine tower at their respective first ends and being connected to each other at their respective second ends,
   the damping element being connected at its first end to the respective second ends of the bracing elements of the first toggle and being connected at its second end to the respective second ends of the bracing elements of the second toggle.

8. The wind turbine of claim 1, wherein a plurality of vibration damping systems are coupled to each other in an area positioned substantially at a central axis of the substantially tubular structure.

9. The wind turbine of claim 8, wherein the plurality of vibration damping systems are coupled by a friction pendulum bearing system.

10. The wind turbine of claim 8, wherein at least three vibration damping systems are coupled to each other.

11. The wind turbine of claim 1, wherein the damping element of at least one vibration damper system is a controllable magnetorheological fluid damper.

12. The wind turbine of claim 1, wherein at least two of the substantially tubular segments comprise at least one vibration damping system.

13. A method of using a plurality of toggle-brace vibration damping systems for damping vibrations in a wind turbine, the method comprising:
   installing a first and a second toggle-brace vibration damping system in a substantially tubular wind turbine tower;
   using the first toggle-brace vibration damping system to dampen a first vibration mode in the wind turbine tower; and using the second toggle-brace vibration damping system to dampen a second vibration mode in the wind turbine tower.

14. A method of using a plurality of toggle-brace vibration damping systems for damping vibrations in a wind turbine, the method comprising:
   installing one or more toggle-brace vibration damping system in a substantially tubular wind turbine tower; and
   using the one or more of the vibration damping system to dampen a vibration in the wind turbine tower;
wherein at least one toggle-brace vibration damping system is used for damping vibrations in a first tower segment, and at least one other vibration damping system is used for damping vibrations in another tower segment.

15. A wind turbine comprising a substantially tubular tower structure having a plurality of tower segments and toggle-brace vibration damping systems including a plurality of bracing elements and a damping element, the toggle-brace vibration damping systems being connected to the tower structure;
   wherein three or more toggle-brace vibration damping systems are axisymmetrically arranged and are coupled to each other by a friction pendulum bearing system in an area positioned substantially at a central axis of the tower segment.

* * * * *